US012593106B2

(12) United States Patent
Balaraja Shetty et al.

(10) Patent No.: US 12,593,106 B2
(45) Date of Patent: Mar. 31, 2026

(54) RESTORING A MULTIMEDIA DEVICE TO PREVIOUS SETTINGS

(71) Applicant: DISH Network Technologies India Private Limited, Bangalore (IN)

(72) Inventors: Vikram Balaraja Shetty, Karnataka (IN); Manasa Jami, Andhra Pradesh (IN); Visali Manoharan, Chennai (IN); Dileep Puramana, Kerala (IN)

(73) Assignee: DISH Network Technologies India Private Limited, Bangalore (IN)

( * ) Notice: Subject to any disclaimer, the term of this patent is extended or adjusted under 35 U.S.C. 154(b) by 0 days.

(21) Appl. No.: 18/753,925

(22) Filed: Jun. 25, 2024

(65) Prior Publication Data

US 2025/0392790 A1 Dec. 25, 2025

(51) Int. Cl.
*H04N 21/485* (2011.01)
*H04N 21/466* (2011.01)

(52) U.S. Cl.
CPC ......... *H04N 21/485* (2013.01); *H04N 21/466* (2013.01)

(58) Field of Classification Search
CPC ........................... H04N 21/485; H04N 21/466
See application file for complete search history.

(56) References Cited

U.S. PATENT DOCUMENTS

| | | | |
|---|---|---|---|
| 2005/0120383 A1* | 6/2005 | Ozaki | H04N 21/485 |
| | | | 725/135 |
| 2013/0238889 A1* | 9/2013 | Fernandez | G06Q 10/30 |
| | | | 713/100 |
| 2019/0140899 A1* | 5/2019 | Ingah | H04L 41/0806 |
| 2023/0073037 A1* | 3/2023 | Candelore | H04N 21/482 |
| 2023/0402033 A1* | 12/2023 | Heinzmann | G10L 15/22 |

* cited by examiner

*Primary Examiner* — Kyu Chae
(74) *Attorney, Agent, or Firm* — Perkins Coie LLP

(57) ABSTRACT

The present disclosure is directed to methods and systems for restoring a multimedia device to previous settings. A first configuration of one or more settings of a set-top box is stored as a restorable settings configuration. The one or more settings of the set-top box are adjusted to a second configuration that differs from the restorable settings configuration. A trigger event for restoring the one or more settings of the set-top box to the restorable settings configuration is determined to have occurred. In response to determining that the trigger event has occurred and without individually adjusting the one or more settings of the set-top box, the one or more settings of the set-top box are restored to the restorable settings configuration.

20 Claims, 8 Drawing Sheets

RESTORING A MULTIMEDIA DEVICE TO PREVIOUS SETTINGS

BACKGROUND

A user can have a set of preferred settings for enjoying multimedia content provided by a multimedia device. Over the course of time, however, they themselves or other users may adjust the settings of the electronic device to something different from the preferred settings. Many users, such as elderly persons, may struggle to adjust the settings of the multimedia device back to their preferred settings. Moreover, even if it may be relatively simple to adjust the settings back to the preferred settings, the process can be overly time consuming. Accordingly, user experience is degraded from the user having to experience content with unpreferred settings or from the user having to repeatedly adjust the device settings.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
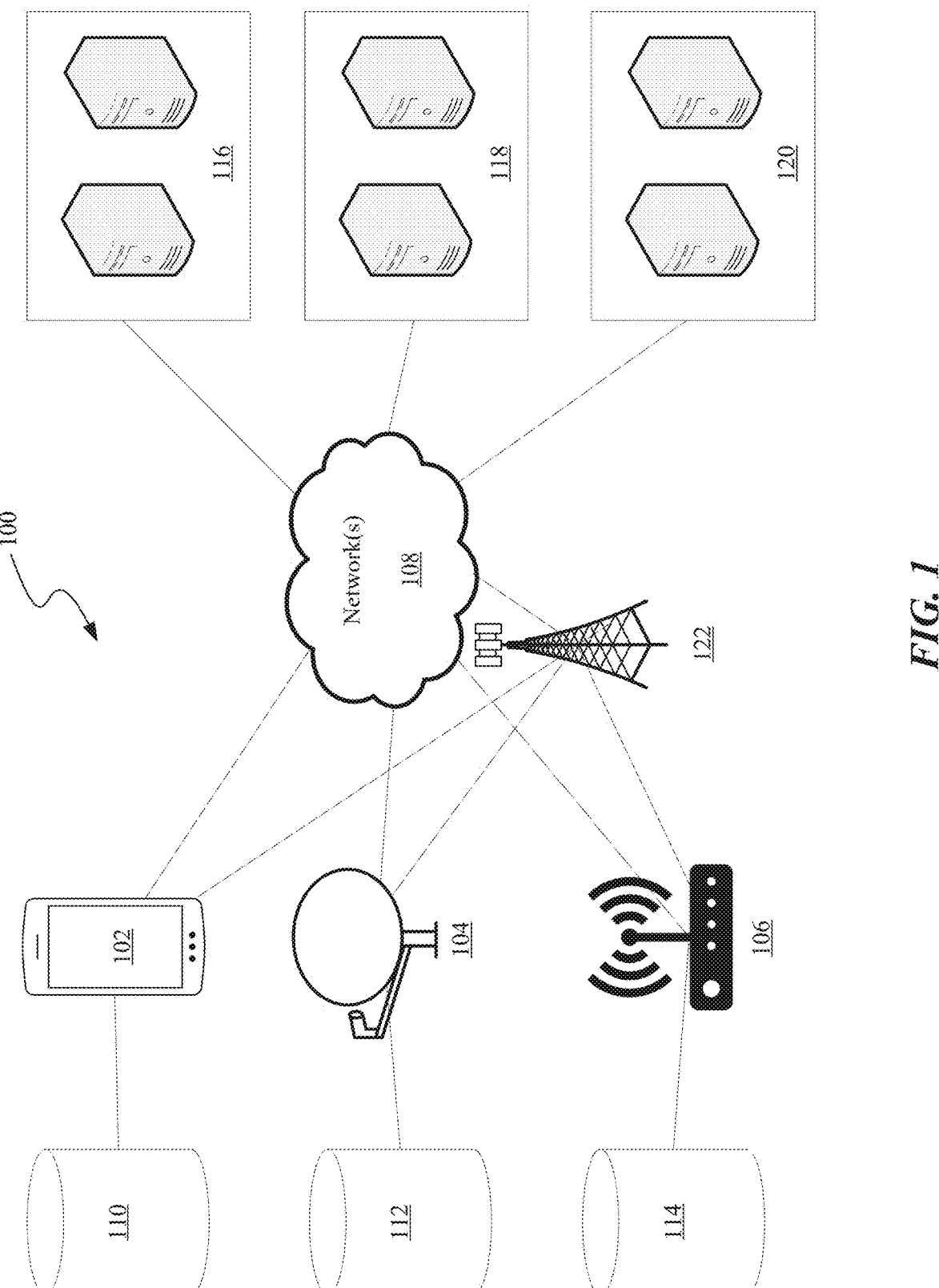
FIG. 1 illustrates an example of a distributed system for restoring a multimedia device to previous settings, in accordance with one or more embodiments of the present technology.

Aspects of the present disclosure are directed to systems and methods for restoring a multimedia device to previous settings. Multimedia devices, such as set-top boxes for displaying multimedia content on a display, include settings that can be used to tailor the enjoyment of content to a particular user. For example, a user can adjust volume settings, brightness settings, tile size of objects displayed, the presence or language of subtitles, or a favorite channels list. A user can have a configuration of settings that they most prefer for enjoying content on the multimedia device. Given that multimedia devices are often used by multiple users or that some content may be best enjoyed with particular settings, the settings of a multimedia device may, over time, be changed from a user's preferred settings.

Typically, to adjust the settings back to the preferred settings, the user would navigate to a settings menu and individually reset the adjusted settings. This solution has various challenges. First, the user may not remember their preferred settings. Second, navigating to the settings menu and individually resetting each of the adjusted settings can be a time-consuming process that degrades the user's experience. Thirdly, some users may lack the technical familiarity to conveniently navigate to the settings menu and adjust the settings back to the preferred settings. For example, elderly users or children may struggle to navigate complicated remotes and menus. As a result, a user's experience using the multimedia devices may be degraded.

To address these problems and others, methods and systems disclosed herein can be used to store preferred settings of a multimedia device that can be restored when the settings of the multimedia device have been changed. The settings of the multimedia device can be restored to the preferred settings without navigating to a settings menu of the multimedia device or without individually adjusting each of the settings of the multimedia device. In some embodiments, the settings of the multimedia device can be restored to the multimedia device without any intervention from the user. For example, the multimedia device can be restored automatically to the preferred settings when the multimedia device is powered on or off. Alternatively or additionally, a system can monitor changes to the settings of the multimedia device or user inputs to the multimedia device to determine (e.g., based on previous behavior) whether a restore to the preferred settings is desired. If it is determined that such a restore is desired, the multimedia device can be restored to the preferred settings.

The disclosed methods and systems further enable an administrator to efficiently restore the multimedia device to the preferred settings without intervention from the user themselves, which can be particularly difficult for technically challenged users, such as elderly persons or children. In some cases, caretakers may wish to control the settings of multimedia devices providing content to elderly or hospitalized persons that may otherwise find it difficult to control the device. Parents and business owners may desire similar control over multimedia devices providing content to their children and customers, respectively. To provide such control, administrators can receive a notification that indicates that a user may desire the settings of the multimedia device to be restored to preferred settings (but is unable to do so due to their lack of technical familiarity). The administrator can respond to the notification by remotely restoring the multimedia device to the preferred settings, thereby abrogating the need for the administrator to physically travel to the multimedia device to change the settings (e.g., through a remote control communicatively coupled, at a short distance, with the multimedia device).

In general, the methods and systems disclosed herein can: 1) enable difficult to remember preferred settings to be stored for future restore; 2) decrease the time required to adjust a multimedia device back to a user's preferred settings; 3) improve the user experience of technically challenged users; and 4) provide for an administrator separate from the user to efficiently manage the settings of the multimedia device and improve user experience, especially for technically challenged users.

FIG. 1 illustrates an example of a distributed system 100 for restoring a multimedia device to previous settings, in accordance with one or more embodiments of the present technology. Example system 100 presented is a combination of interdependent components that interact to form an integrated whole for restoring multimedia devices to previous settings. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may provide multimedia content in accordance with one or more settings (e.g., volume settings, brightness settings, tile size of objects displayed, the presence or language of subtitles, or a favorite channels list). In one example, a client device 102 may be a mobile phone, a client device 104 may be a smart OTA antenna, and a client device 106 may be a broadcast module box (e.g., set-top box (STB)). In other example aspects, client device 106 may be a gateway device that is in communication with other gateway devices and multimedia content providers. Other possible client devices include but are not limited to tablets, personal computers, televisions, etc. In aspects, a client device, such as client devices 102, 104, and 106, may store a current configuration of settings as a restorable settings configuration. After the settings have been adjusted from the restorable settings configuration, a client device, such as client devices 102, 104, and 106, may restore the settings to the restorable settings configuration. Client devices 102, 104, and 106 may be equipped to receive live requested content data and output the content in accordance with the one or more settings. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that allows a user to access multimedia content. The media content may be stored locally on the client device or run remotely via network(s) 108. For example, a client device may receive a signal from broadcast tower 122 containing the media content. The signal may indicate the user requested media content. The client device may receive this user-requested content data and subsequently store this data locally in databases 110, 112, and/or 114. In alternative scenarios, the user-requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user-requested content data in the background.

In some example aspects, client devices 102, 104, and/or 106 may be equipped to receive signals from an input device. Signals may be received on client devices 102, 104, and/or 106 via Bluetooth, WiFi, infrared, light signals, or binary, among other mediums and protocols for transmitting/receiving signals. For example, a user may use a mobile device 102 to check for the media content data from a channel from an OTA antenna (e.g., and antenna, such as client device 104). A graphical user interface may display on the mobile device 102 indicating the media content search results of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as client device 106.

In other examples, databases stored on remote servers 116, 118, and 120 may be utilized to assist the system in identifying the user-requested media content. Such databases may contain certain media content data such as video titles, actors in movies, video genres, etc. Such data may be transmitted via network(s) 108 to client devices 102, 104, and/or 106 to assist in identifying user-requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
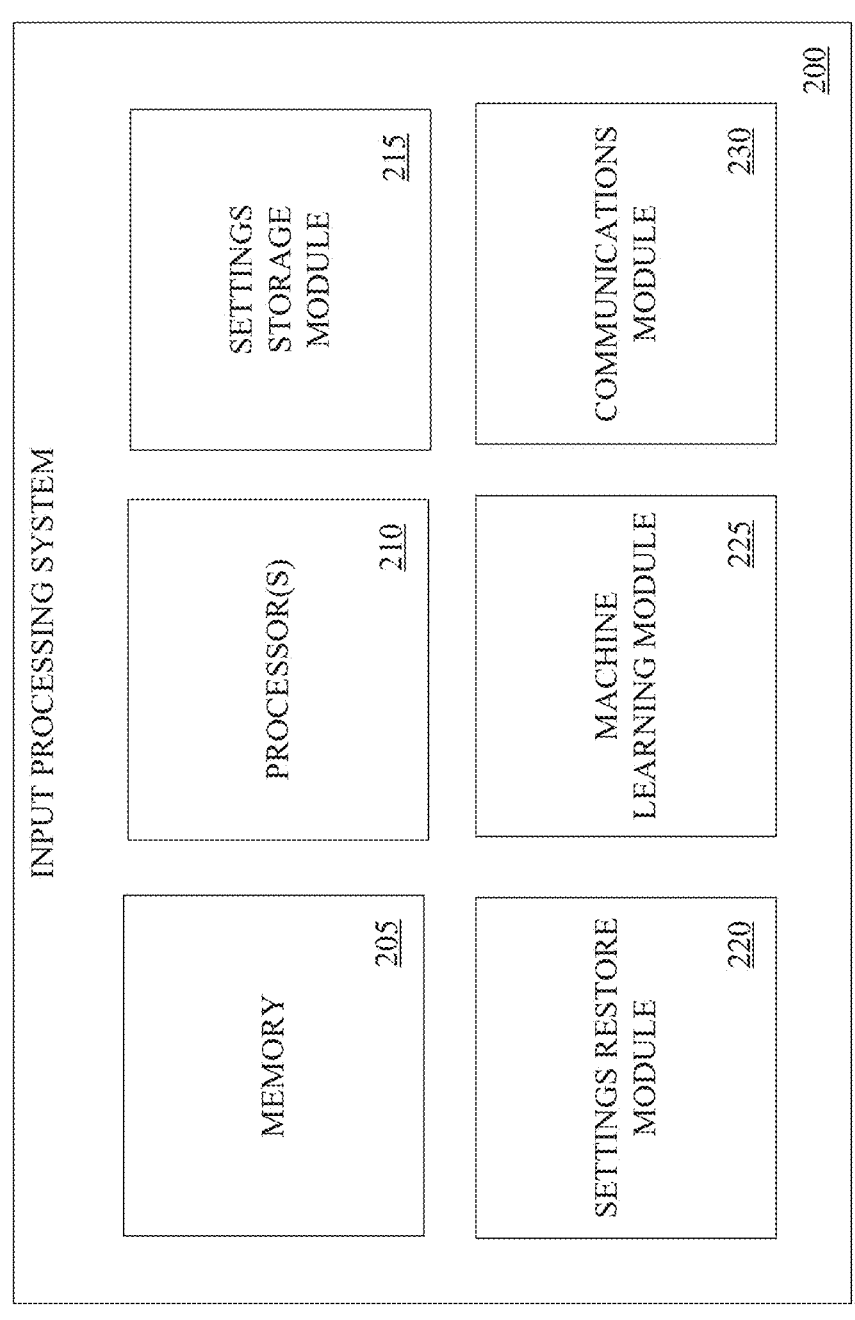
FIG. 2 illustrates an example input processing system for implementing systems and methods for restoring a multimedia device to previous settings, in accordance with one or more embodiments of the present technology.

FIG. 2 illustrates an example input processing system 200 for implementing systems and methods for restoring a multimedia device to previous settings, in accordance with one or more embodiments of the present technology. The input processing system 200 (e.g., one or more data processors) is capable of executing algorithms, software routines, and/or instructions based on processing data provided by a variety of sources related to settings configuration. The input processing system can be a general-purpose computer or a dedicated, special-purpose computer. According to the embodiments shown in FIG. 2, the disclosed system can include memory 205, one or more processors 210, settings storage module 215, settings restore module 220, machine learning module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of settings storage module 215, settings restore module 220, machine learning module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing the restorable settings configuration, user/account data, or any other data associated with configuring settings of a multimedia device.

The settings storage module 215 can be used to store a configuration of settings as a restorable settings configuration to be accessed for future restores. In aspects, the settings storage module 215 is responsible for determining if a trigger condition to store a settings configuration as a restorable settings configuration has been triggered. This could include analyzing user inputs to the multimedia device or changes to the settings of the multimedia device. For example, a user can specifically indicate to the settings storage module 215 that the current settings should be stored as a restorable settings configuration through user input, or the settings storage module 215 can automatically determine that the current settings should be stored as a restorable settings configuration based on the settings changing from previous or default settings.

The settings storage module 215 can store the restorable settings in association with a particular multimedia device or a particular user/user account. For example, each multimedia device can have different preferred settings and the settings storage module 215 can manage settings for multiple multimedia devices. Thus, to enable settings for a particular multimedia device to be restored without affecting other multimedia devices, the restorable settings configuration of that multimedia device can be stored in association with the multimedia device. In yet other aspects, an individual multimedia device can be used by multiple users that have different preferred settings. Thus, the settings storage module 215 can store the restorable settings configuration in association with particular users to enable a specific user to restore the settings of a multimedia device to their preferred settings when logged into their user account without affecting the settings of other users using the multimedia device.

The settings restore module 220 can adjust the settings of a multimedia device or user account on the multimedia device to restore the settings to the restorable settings configuration. To do so, the settings restore module 220 can access the restorable settings configuration stored by the settings storage module 215. In aspects, the settings restore module 220 is further responsible for determining that a trigger event to restore a multimedia device to the restorable settings configuration has occurred. In response to determining that the trigger event has occurred, the settings restore module 220 can restore the settings of the multimedia device to the restorable settings configuration. In some implementations, the trigger to restore the settings to the restorable settings configuration can be the multimedia device powering on or off, a user input indicating to restore the multimedia device to the restorable settings configuration, user input indicating that a user is attempting to adjust the multimedia device settings, or a change in the multimedia device settings. For example, if a user is providing user inputs that relate to settings of the multimedia device (e.g., the menu button, volume button, accessing channel favorites, adjusting subtitles) or if the settings of the multimedia device have been changed, the settings restore module 220 can determine that a restore of the multimedia device settings is desired. Thus, the settings restore module 220 can determine the occurrence of a trigger event to restore the settings of the multimedia device by analyzing user inputs to the multimedia device or changes in device settings.

The settings restore module 220 can restore multimedia device settings without requiring the user to navigate to a settings menu of the multimedia device or individually adjust the settings. For example, the settings restore module 220 can restore all settings of the multimedia device to the restorable settings configuration without requiring the adjustment of individual settings. Moreover, in some cases, the settings restore module 220 can restore the settings of the multimedia device to the restorable settings configuration without requiring any explicit input from the user of the multimedia device to do so. For example, the settings restore module 220 can be triggered to restore the settings of the multimedia device automatically (e.g., by power on/power off of the multimedia device, by analyzing changes in settings of the multimedia device, or by analyzing user inputs to the multimedia device) or remotely by an administrator that monitors the multimedia device. After restoring the settings, content is output by the multimedia device in accordance with the restored settings.

Machine learning module 225 may be configured to determine if a trigger to restore the settings of the multimedia device to the restorable settings configuration has occurred. The machine learning module 225 may analyze user inputs (e.g., at a remote control coupled with the multimedia device) or changes to settings of the multimedia device to determine that a trigger has occurred. The machine learning module 225 then determines whether a restore of the settings of the multimedia device is desired by the user based on the user inputs or changes to settings. The machine learning module 225 can perform this analysis based on at least one machine-learning algorithm trained on at least one dataset reflecting a restore trigger event associated with previous user input or changes to settings. The at least one machine-learning algorithm (and model) may be stored locally at databases and/or externally at databases (e.g., cloud databases and/or cloud servers). Electronic devices (e.g., personal computers, smart phones, tablets, multimedia devices, etc.) may be equipped to access these machine learning algorithms and intelligently determine if a restore trigger condition has occurred based on at least one machine-learning (ML) model that is trained on previous restore trigger events.

As described herein, an ML model may refer to a predictive or statistical utility or program that may be used to determine a probability distribution over one or more character sequences, classes, objects, result sets, or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process historical trigger events and other data stores (e.g., user inputs, changes to settings, etc.) to determine the occurrence of a restore trigger condition. The trained ML model may be deployed to one or more devices. As a specific example, an instance of a trained ML model may be deployed to a server device and to a client device. The ML model deployed to a server device may be configured to be used by the client device when, for example, the client device is connected to the internet. Conversely, the ML model deployed to a client device may be configured to be used by the client device when, for example, the client device is not connected to the internet.

Communications module 230 is associated with sending/receiving information (e.g., from the settings storage module 215, the settings restore module 220, the machine learning module 225, and so on) with a remote server or with one or more client devices, databases, routers, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends the restorable settings configuration from the settings storage module 215 to be stored in a database for use in a future restore. The communications module 230 can receive the restorable settings configuration from the database and provide them to the settings restore module 220 for use in restoring the multimedia device to the restorable settings configuration.

In some embodiments, the communications module 230 can communicate with an administrator of the multimedia device to indicate that a restore of the multimedia device settings is desired by the user. For example, in response to determining that a restore trigger event has occurred (e.g., by the settings restore module 220 or the machine learning module 225), the communications module 230 can communicate with an administrator of the multimedia device to inform the administrator of the trigger event. The administrator can be notified through an application running on a device separate from the multimedia device. In response, the administrator can ignore the notification or remotely trigger a restore of the multimedia device settings to the restorable settings configuration. The communications module 230 can receive this trigger from the administrator and provide it to the settings restore module 220, which in turn restores the settings of the multimedia device to the restorable settings configuration.

Figure 3:
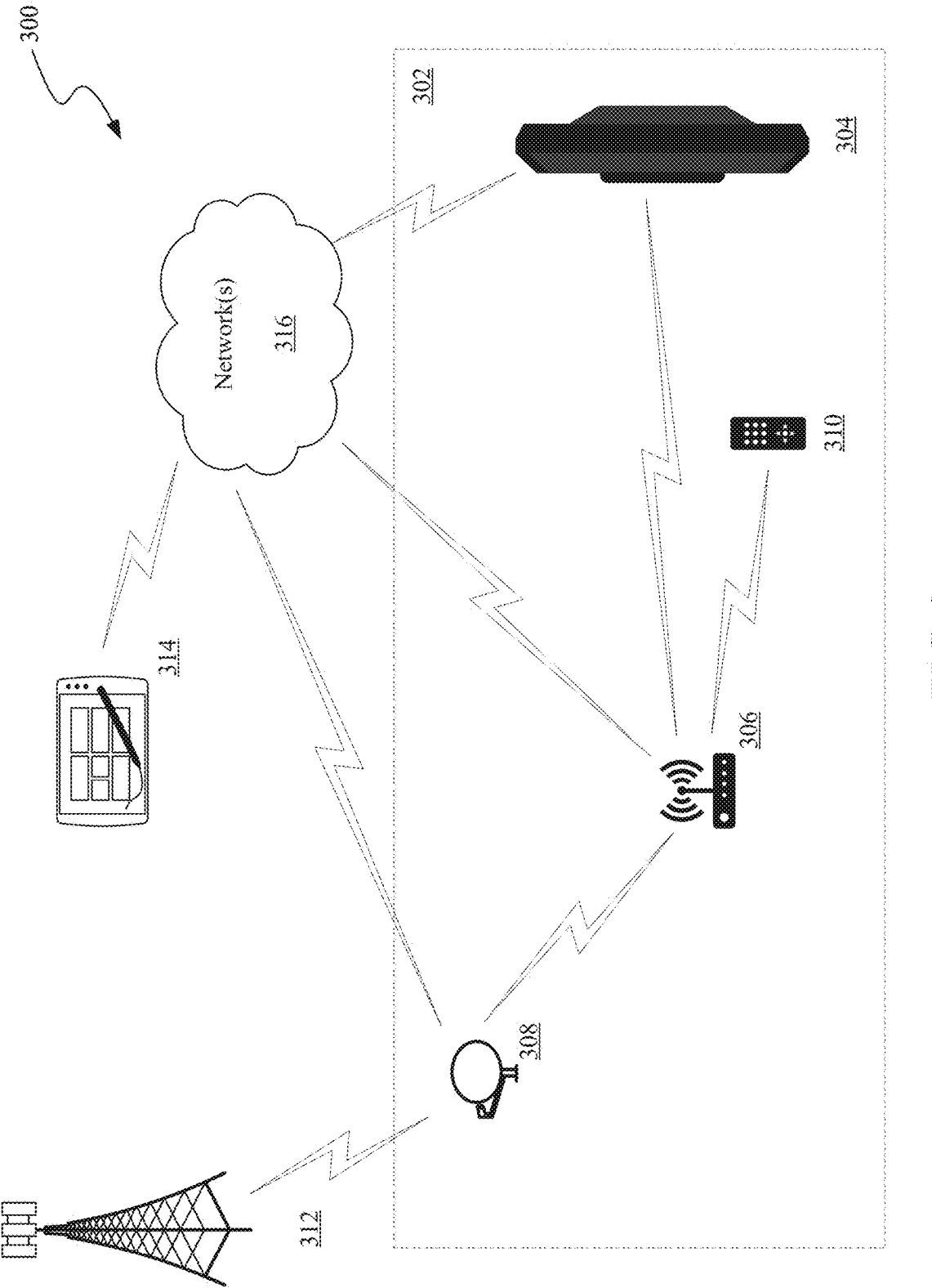
FIG. 3 illustrates an example operating environment for implementing systems and methods for restoring a multimedia device to previous settings, in accordance with one or more embodiments of the present technology.

FIG. 3 illustrates an example operating environment 300 for implementing systems and methods for restoring a multimedia device to previous settings, in accordance with one or more embodiments of the present technology. In the example environment 300 illustrated in FIG. 3, area 302 may represent a house, a commercial building, an apartment, a condo, an elder care facility, a hospital, or any other type of suitable dwelling. Inside area 302 is at least one television 304, an OTA box 306 (e.g., broadcast module box, such as a set-top box), an OTA antenna 308, and a remote control 310. The OTA antenna 308 may be configured to receive local broadcast signals carrying multimedia content from local broadcast tower 312 or satellite broadcast tower and provide the broadcast signals to the OTA box 306. The OTA box 306 may be configured as a central gateway communicable with various multimedia content providers and devices, among other servers and databases housing multimedia content available for retrieval and display on user devices. The television 304 can display media output by the OTA box 306. The remote control 310 is communicatively coupled with the OTA box 306 and can be used by the user to control operation of the OTA box 306 through input. For example, the user can use the remote control 310 to adjust one or more settings that control the way in which content is output by the OTA box 306.

The television 304, the OTA box 306, or the OTA antenna 308 can connect with network(s) 316 that provide connectivity to one or more other devices. The network(s) 316 may be a WiFi network and/or a cellular network. An electronic device 314 can couple with the network(s) 316 to control operations of the OTA box 306. For example, the electronic device 314 can be used by an administrator to run an application that monitors operation of the OTA box 306. In aspects, the electronic device 314 can be notified through the network(s) 316 when settings of the OTA box 306 need to be restored to the restorable settings configuration. The electronic device 314 can initiate a restore of the settings of the OTA box 306 to the restorable settings configuration through the network(s) 316. Although illustrated as communicating through the network(s) 316, in some cases, the electronic device 314 can control operation of the OTA box 306 through direct communication (e.g., peer-to-peer communication).

Figure 4:
FIG. 4 is a flow diagram illustrating a process used in some implementations for storing previous settings of a multimedia device, in accordance with one or more embodiments of the present technology.
Figure 4:
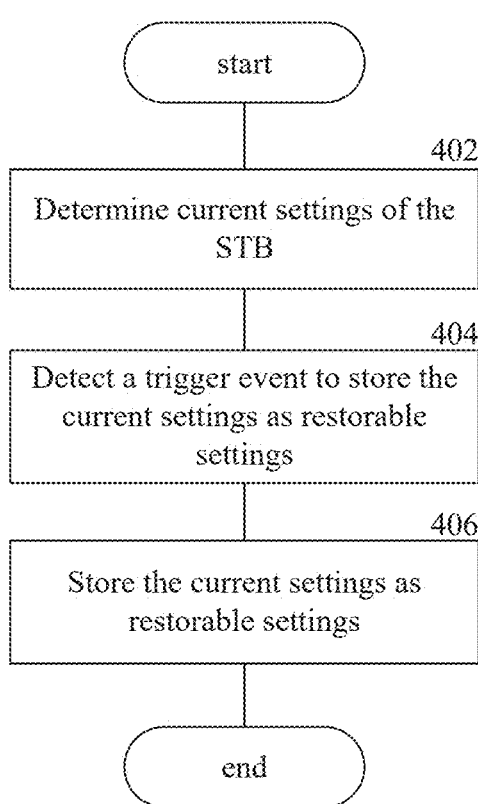

FIG. 4 is a flow diagram illustrating a process 400 used in some implementations for storing previous settings of a multimedia device, in accordance with one or more embodiments of the present technology. In various implementations, some or all of process 400 is performed locally at the multimedia device or performed by cloud-based device(s) that can support the multimedia device.

At 402, the current settings of the multimedia device are determined. The settings of the multimedia device can relate to the output of content by the multimedia device. For example, the settings of the multimedia device can include volume settings that control the volume at which audio is output from speakers coupled with the multimedia device or brightness settings that control the brightness of visual data output from a display (e.g., television) coupled with the multimedia device. The settings of the multimedia device can further include a tile size, which controls the size of objects displayed on a display coupled with the multimedia device, the presence or language of subtitles, or channels within a favorite channels list. The current settings can be associated with the multimedia device as a whole or with a particular user of the multimedia device. For example, a multimedia device can be used by multiple users with one or more of the users using the multimedia device on different accounts. Settings of the multimedia device can vary across accounts such that content output on a first account will differ from content output on a second account.

At 404, a trigger event to store the current settings as restorable settings is detected. The trigger event can be a user input from a user of the multimedia device to store the current settings as restorable settings. In other cases, the trigger event can be when one or more of the settings of the multimedia device are changed from default (e.g., settings set when the multimedia device is installed or provisioned) or previously selected settings. In such a case, the multimedia device can automatically store the updated settings or prompt the user (e.g., with a visual or audio notification output by the multimedia device) asking whether the user would like to store the current settings as restorable settings and determine that the trigger event has occurred if the user accepts. In other cases, it can be determined that the trigger event to store the current settings as restorable settings has occurred when the current settings have stayed the same for a certain period of time (e.g., one minute, five minutes, one hour, six hours, one day, one week, and so on). Again, this trigger event can be determined automatically or in response to user input accepting to store the current settings as restorable settings.

At 406, the current settings of the multimedia device are stored as restorable settings. The restorable settings can be stored at the multimedia device itself or at a remote location coupled with the multimedia device (e.g., a remote server). The restorable settings can be specific for the particular multimedia device. Thus, other multimedia devices, even if managed by the same administrator, may not be restored to the same restorable settings. Similarly, the restorable settings can be stored in association with a particular user/user account to differentiate between different users/user accounts on the same multimedia device. In this way, settings can be restored for a particular user without affecting the other users on the multimedia device.

Figure 5:
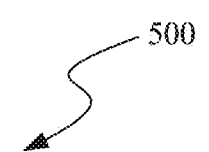
FIG. 5 is a flow diagram illustrating a process used in some implementations for restoring a multimedia device to previous settings, in accordance with one or more embodiments of the present technology.
Figure 5:
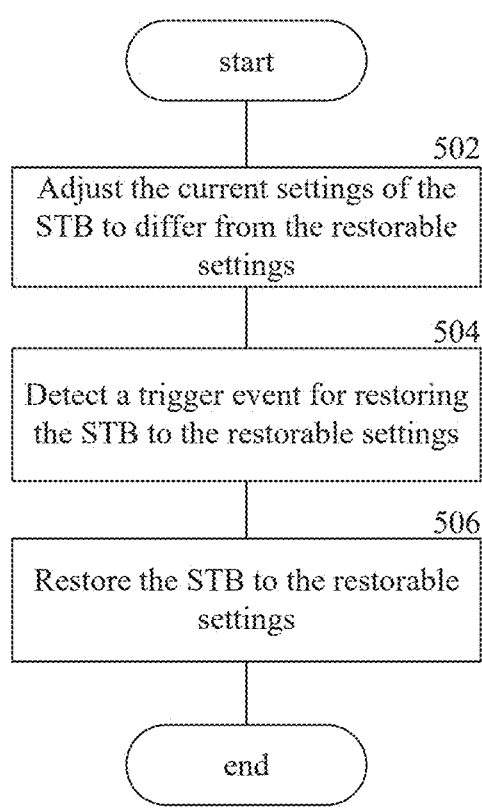

FIG. 5 is a flow diagram illustrating a process 500 used in some implementations for restoring a multimedia device to previous settings, in accordance with one or more embodiments of the present technology. In some implementations, the process 500 is performed after a restorable settings configuration has been stored in memory, as illustrated in process 400 of FIG. 4. In various implementations, some or all of process 500 is performed locally at the multimedia device or performed by cloud-based device(s) that can support the multimedia device.

At 502, the current settings of the multimedia device are adjusted to differ from the restorable settings configuration. The current settings of the multimedia device can be adjusted in accordance with user inputs at a remote control communicatively coupled with the multimedia device. In some cases, the current settings may be adjusted by a different user than the normal user of the multimedia device. As a specific example, a grandchild may visit their grandparent in an elder care facility in which their grandparent is residing. While visiting, they may enjoy content on the multimedia device and, while doing so, change the settings from their grandparent's preferred settings. Later, after their grandchild has left, the grandparent may wish to enjoy content on the multimedia device. Given that the settings were changed by their grandchild, however, the multimedia device may fail to provide content in accordance with the grandparent's preferred settings. In such a case, a technically challenged elderly person may struggle to restore the settings to their preferred settings, finding it difficult to navigate the settings menu with multiple options.

Using the disclosed process 500, however, the multimedia device can be easily restored to the previously stored restorable settings configuration without requiring the user to individually adjust the settings through a settings menu, thereby reducing user frustration, particularly for technically challenged users. For example, at 504, a trigger event to restore the multimedia device to the restorable settings configuration can be detected. The trigger event can be detected by analyzing user input (e.g., at the remote control communicatively coupled with the multimedia device) or changes to the settings of the multimedia device. For example, the trigger event can include receiving a user input (e.g., on a dedicated button of the remote control) to restore the settings to the restorable settings configuration. In another example, the trigger event can be when the multimedia device powers on or off. In some cases, the trigger event can include when the settings of the multimedia device are changed.

In yet other aspects, the trigger event can include a determination that the user desires for the settings of the multimedia device to be restored to the restorable settings configuration. This determination can be based on analyzing user inputs (e.g., to determine that a user is attempting to navigate to a settings menu or adjust the settings) or changes to the settings (e.g., indicating that a user is trying to change settings back to their previous configuration but may not remember the specific settings). In some cases, the determination that the user desires for the settings of the multimedia device to be restored to the restorable settings configuration can be determined using an ML model. For example, user inputs or changes to the settings can be input to an ML model trained on previous trigger events characterized by historical user inputs or historical changes to settings.

In some embodiments, the trigger event can occur without any intervention from the user of the multimedia device or any other individual, such as an administrator of the multimedia device. In other cases, the trigger event occurs only when the user or another individual, such as the administrator, indicates to restore the settings. In such cases, the determination of whether the user wishes to restore the settings (e.g., based on user inputs or changes to the settings) can be used to determine when to prompt the user or the administrator for permission to restore the multimedia device to the restorable settings configuration.

At 506, in response to the trigger event, the settings of the multimedia device are restored to the restorable settings configuration. The settings can be restored all at once without requiring the user of the multimedia device to individually adjust the settings. In some cases, the settings of the multimedia device can be restored without any explicit indication from the user to do so. For example, the restore can occur automatically in response to a trigger event initiated by the administrator of the multimedia device or initiated by the multimedia device (or a remote computing device supporting the multimedia device) itself. In this way, the user can enjoy content from the multimedia device with their preferred settings without having to manually adjust the settings.

The settings can be restored for the entire multimedia device or for a single user of the multimedia device. For example, if a multimedia device includes multiple user accounts, the settings can be restored to the restorable settings configuration for the user account currently active on the multimedia device (e.g., the account that caused the trigger event). In other cases, where there is only a single user account or the settings are not unique across user accounts, the multimedia device settings can be restored to the restorable settings configuration for all user accounts on the device.

Figure 6:
FIG. 6 is a flow diagram illustrating a process used in some implementations for notifying an administrator of a multimedia device to restore the device to previous settings, in accordance with one or more embodiments of the present technology.
Figure 6:
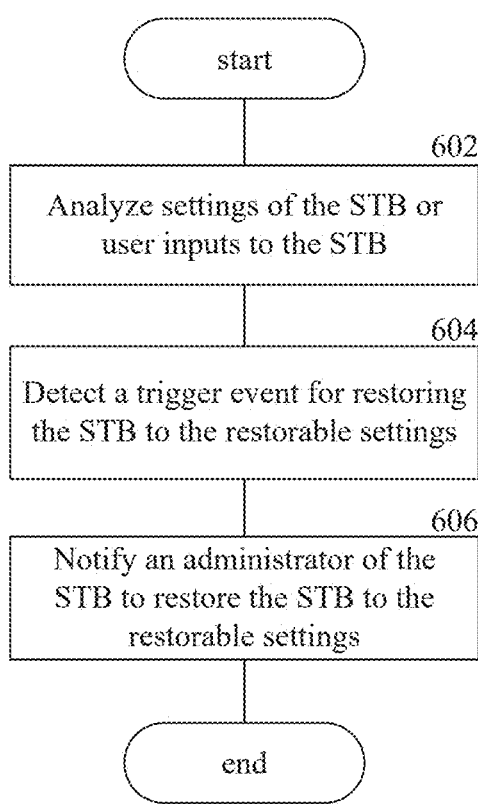

FIG. 6 is a flow diagram illustrating a process 600 used in some implementations for notifying an administrator of a multimedia device to restore the device to previous settings, in accordance with one or more embodiments of the present technology. The administrator can include an individual different from the user enjoying content on the multimedia device and responsible for managing the settings of the multimedia device. In aspects, the administrator can utilize the notification to initiate a restore of the settings of the multimedia device, as illustrated in process 500 of FIG. 5. As a specific example, the administrator can be an administrator at an elder care facility or hospital that provides content using multimedia devices to their residents/patients.

At 602, the changes to the settings of the multimedia device or user inputs to the multimedia device are analyzed to determine if the user of the multimedia device desires for the settings to be restored to the restorable settings configuration. For example, the user inputs or changes to multimedia device settings over a period of time (e.g., ten seconds, one minute, 5 minutes, one hour, and so on) can be analyzed to determine if the user of the multimedia device desires for the settings to be restored to the restorable settings configuration.

At 604, a trigger event is detected to have occurred based on the analysis of the user inputs to the multimedia device or the changes to the settings of the multimedia device. If it is determined that the user desires to restore the multimedia device to the restorable settings, the trigger event can be determined to have occurred. In general, the trigger event can include events similar to the trigger events discussed at 504. In some embodiments, this analysis can be at least partially performed by an ML model. Accordingly, no explicit input by the user to restore the settings of the multimedia device must be made to cause the trigger event to occur.

At 606, in response to detecting that the trigger event has occurred, the administrator of the multimedia device is notified to restore the settings of the multimedia device to the restorable settings configuration. The administrator can monitor one or more multimedia devices through an application running on a device separate from the multimedia device. For example, the administrator can utilize an application associated with a provider of the multimedia device to monitor the multimedia device. In other cases, the multimedia device can interface with an application that is used to manage a facility in which the multimedia devices are deployed (e.g., an elder care facility or hospital). In this way, the administrator can monitor the multimedia devices through a facility management program that is already utilized by the administrator, thereby increasing convenience.

The notification can cause a message (e.g., audio or video) to be displayed to the administrator on the application. The administrator can ignore the notification or choose to initiate a restore of the settings of the multimedia device, which can act as a trigger event at operation 504 of FIG. 5. In this way, the administrator can remotely restore the settings of the multimedia device without requiring the administrator to physically travel to the multimedia device.

Figure 7:
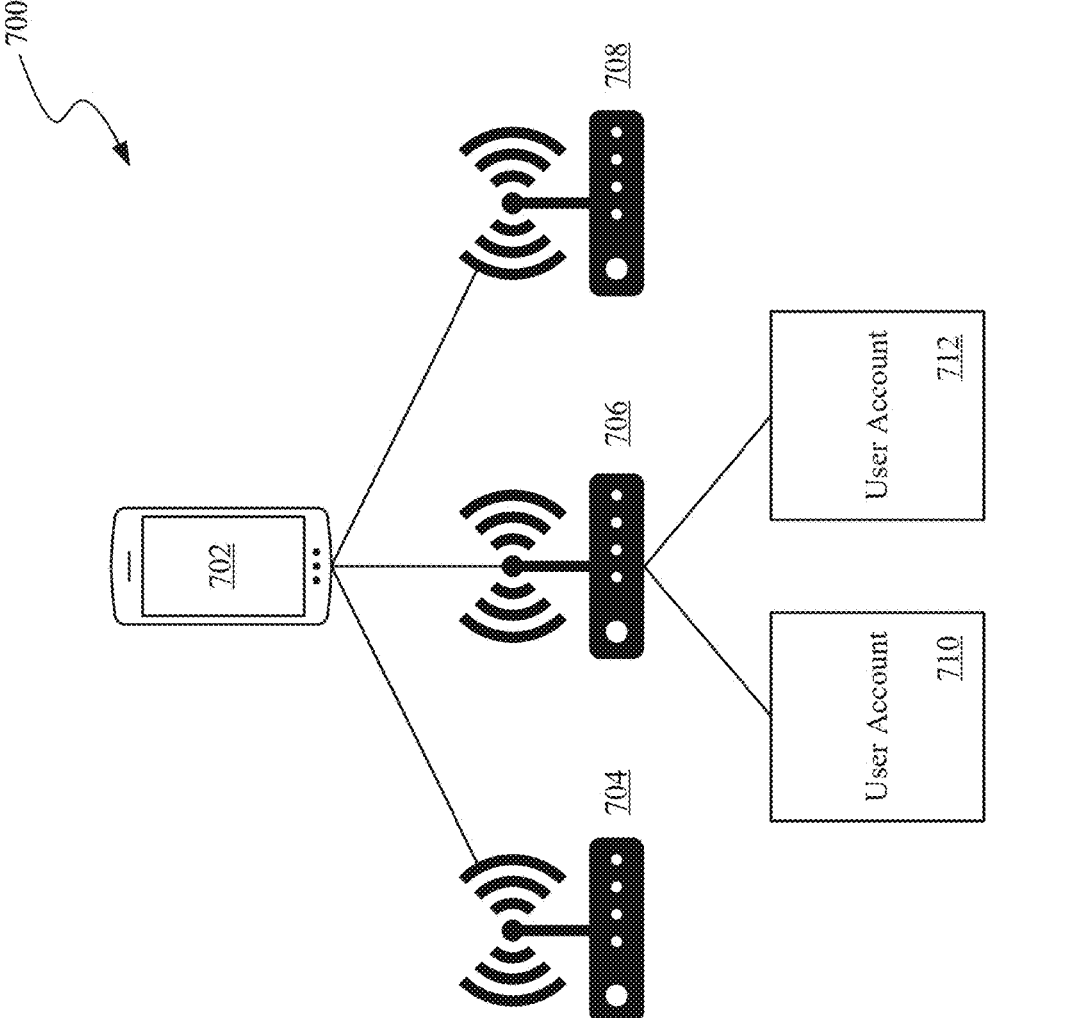
FIG. 7 is a tree diagram illustrating an example hierarchy for an administrator of multimedia devices, in accordance with one or more embodiments of the present technology.

FIG. 7 illustrates tree diagram 700 illustrating an example hierarchy for an administrator of multimedia devices, in accordance with one or more embodiments of the present technology. The administrator can utilize an application running on electronic device 702 to manage multimedia devices 704, 706, 708. In aspects, multimedia devices 704, 706, 708 can be deployed in one or more facilities managed by the administrator. As particular examples, the multimedia devices 704, 706, 708 can be deployed in a commercial environment, such as an elder care facility or hospital. In this case, the administrator can be an administrator of the elder care facility or hospital. As another example, the multimedia devices 704, 706, 708 can be dispersed throughout a home. In such a case, the administrator may be a parent or head of the household.

The administrator can utilize an application running on the electronic device 702 to manage the operation of the multimedia devices 704, 706, 708. For example, the administrator can receive notifications related to a desire to restore settings on the multimedia devices 704, 706, 708 and remotely initiate a restore of the settings using the application. In some cases, the application can be an application associated with a provider of the multimedia devices 704, 706, 708. For example, a cable or satellite TV provider can provide an application that can be used to control the operation of multimedia devices 704, 706, 708 used to output content from the cable or satellite TV provider. In other cases, the application can be a facility management application to enable the administrator to easily manage the multimedia devices 704, 706, 708 through an application already used to manage other aspects of the facility.

The multimedia devices 704, 706, 708 can include a single user account or multiple user accounts. For example, as illustrated, multimedia device 706 includes user account 710 and user account 712. In aspects, a first user will log into user account 710 when enjoying content from the multimedia device 706, while a second user will log into user account 712 when enjoying content from the multimedia device 706. User accounts 710, 712 can be separately managed by the administrator. For example, user account 710 and user account 712 can have different restorable settings configurations corresponding to the preferred settings of the different users. Thus, when being notified of a desire to restore the settings of the multimedia device 706, the administrator can be notified of which user account is have its settings restored and restore the settings for that account. In this way, the settings of user account 710 can be restored to the preferred settings of a user associated with user account 710 without affecting the settings associated with user account 712. Thus, the administrator can manage the settings of separate user accounts associated with a single multimedia device in addition to managing the settings of multiple multimedia devices.

Figure 8:
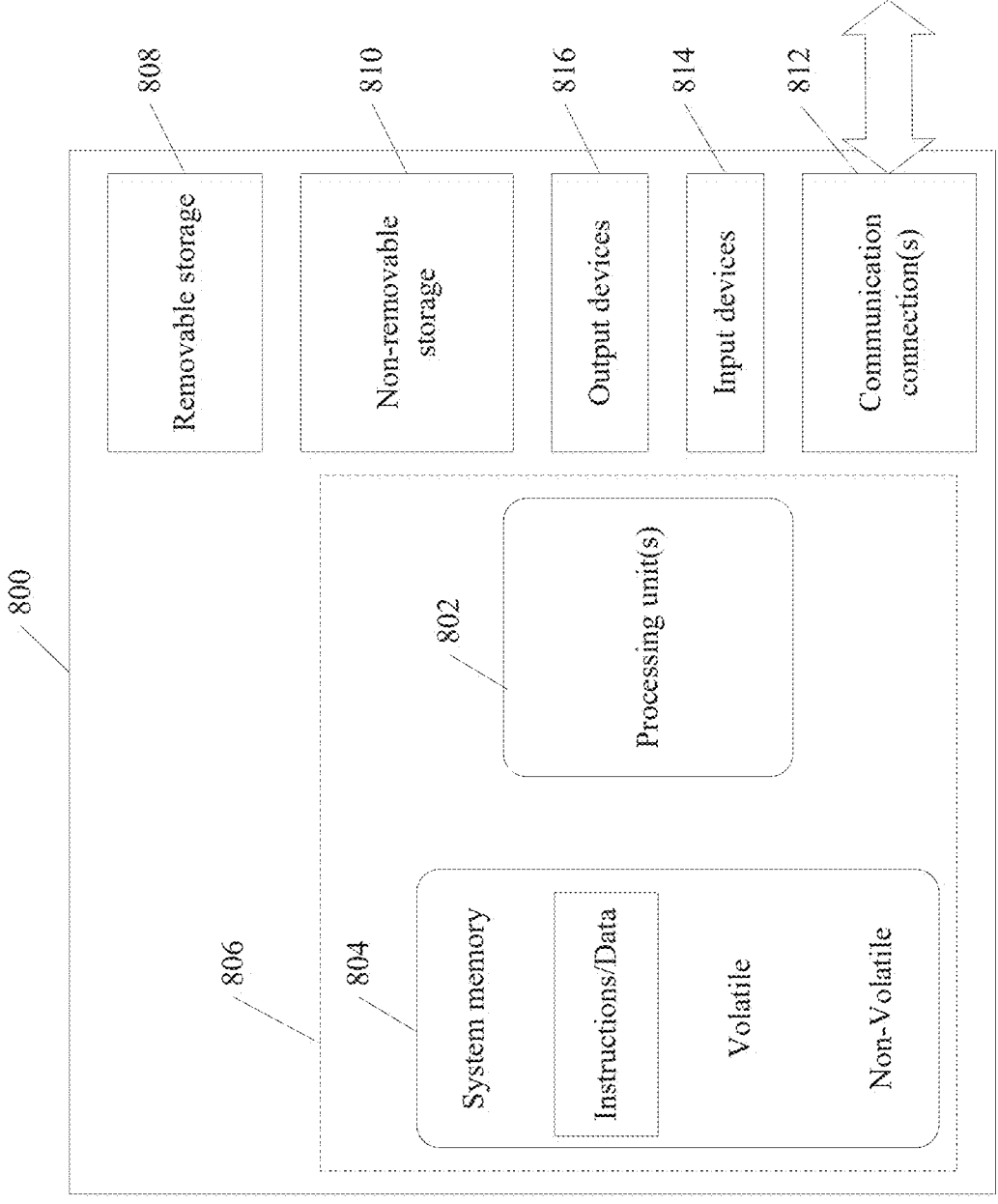
FIG. 8 illustrates one example of a suitable operating environment in which one or more of the present embodiments may be implemented.

FIG. 8 illustrates one example of a suitable operating environment 800 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable 808 and/or non-removable 810) including, but not limited to, magnetic or optical disks or tape. Similarly, environment 800 may also have input device(s) 814 such as keyboard, mouse, pen, voice input, etc., and/or output device(s) 816 such as a display, speakers, printer, etc. Also included in the environment may be one or more communication connections 812, such as Bluetooth, WiFi, WiMax, LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile and removable and non-removable media implemented in any method or technology for storage of information such as computer readable instructions, data structures, program modules, or other data. Computer storage media includes RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The operating environment 800 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A method comprising:
storing a first configuration of one or more settings of a set-top box as a restorable settings configuration,
wherein the one or more settings of the set-top box comprise settings affecting an output of multimedia content by the set-top box,
wherein the restorable settings configuration differs from a default settings configuration of the one or more settings of the set-top box;
in response to a user input from a remote control communicatively coupled with the set-top box, adjusting the one or more settings of the set-top box to a second configuration that differs from the restorable settings configuration;
providing, to an application associated with a content provider of the set-top box and usable for an administrator of the set-top box to manage operation of the set-top box, an indication that the one or more settings of the set-top box differ from the restorable settings configuration;
determining that a trigger event for restoring the one or more settings of the set-top box to the restorable settings configuration has occurred,
wherein the trigger event comprises receiving, from the administrator of the set-top box through the application associated with the content provider, a command to restore the one or more settings of the set-top box to the restorable settings configuration; and
without individually adjusting the one or more settings of the set-top box and in response to determining that the trigger event has occurred, restoring the one or more settings of the set-top box to the restorable settings configuration.

2. The method of claim 1, wherein the one or more settings comprises a favorite channels list, a tile size of the multimedia content output by the set-top box, a volume of the multimedia content output by the set-top box, a brightness of the multimedia content output by the set-top box, or whether to output subtitles with the multimedia content output by the set-top box.

3. The method of claim 1, wherein storing the first configuration of the one or more settings of the set-top box as the restorable settings configuration is responsive to:
determining that the one or more settings of the set-top box have changed; or
receiving, from the remote control, an additional user input indicating to store the first configuration of the one or more settings of the set-top box as the restorable settings configuration.

4. The method of claim 1, wherein:
the first configuration of the one or more settings of the set-top box are stored as the restorable settings configuration in association with a particular user account of the set-top box; and
restoring the one or more settings of the set-top box to the restorable settings configuration comprises restoring the one or more settings of the set-top box to the restorable settings configuration for the particular user account but not for another user account of the set-top box.

5. The method of claim 1, wherein the trigger event further comprises receiving, from the remote control, an additional user input indicating to restore the one or more settings of the set-top box to the restorable settings configuration.

6. The method of claim 1, wherein the application is operating on a remote device separate from the remote control and the set-top box.

7. The method of claim 1, wherein the trigger event further comprises a power on or power off of the set-top box.

8. The method of claim 1, further comprising:
analyzing the one or more settings of the set-top box or one or more additional user inputs at the remote control to determine that a restore of the one or more settings of the set-top box to the restorable settings configuration is desired; and
in response to determining that restore of the one or more settings of the set-top box to the restorable settings configuration is desired, notifying, on the application, the administrator of the set-top box to restore the one or more settings of the set-top box to the restorable settings configuration, the application operating on a remote device separate from the remote control and the set-top box.

9. The method of claim 8, wherein analyzing the one or more settings of the set-top box or the one or more additional user inputs at the remote control comprises utilizing a machine-learning (ML) model, the ML model trained based on at least one instance of previous changes to the one or more settings of the set-top box or at least one instance of previous user inputs at the remote control.

10. A computing system comprising:
one or more processors; and
one or more memories storing instructions that, when executed by the one or more processors, cause the computing system to perform a process comprising:
storing a first configuration of one or more settings of a set-top box as a restorable settings configuration,
wherein the one or more settings of the set-top box comprise settings affecting an output of multimedia content by the set-top box,
wherein the restorable settings configuration differs from a default settings configuration of the one or more settings of the set-top box;

in response to a user input from a remote control communicatively coupled with the set-top box, adjusting the one or more settings of the set-top box to a second configuration that differs from the restorable settings configuration;

providing, to an application associated with a content provider of the set-top box and usable for an administrator of the set-top box to manage operation of the set-top box, an indication that the one or more settings of the set-top box differ from the restorable settings configuration;

determining that a trigger event for restoring the one or more settings of the set-top box to the restorable settings configuration has occurred, wherein the trigger event comprises receiving, from the administrator of the set-top box through the application associated with the content provider, a command to restore the one or more settings of the set-top box to the restorable settings configuration; and without individually adjusting the one or more settings of the set-top box and in response to determining that the trigger event has occurred, restoring the one or more settings of the set-top box to the restorable settings configuration.

11. The computing system of claim 10, wherein the one or more settings comprises a favorite channels list, a tile size of the multimedia content output by the set-top box, a volume of the multimedia content output by the set-top box, a brightness of the multimedia content output by the set-top box, or whether to output subtitles with the multimedia content output by the set-top box.

12. The computing system of claim 10, wherein storing the first configuration of the one or more settings of the set-top box as the restorable settings configuration is responsive to:

determining that the one or more settings of the set-top box have changed; or receiving, from the remote control, an additional user input indicating to store the first configuration of the one or more settings of the set-top box as the restorable settings configuration.

13. The computing system of claim 10, wherein:

the first configuration of the one or more settings of the set-top box are stored as the restorable settings configuration in association with a particular user account of the set-top box; and restoring the one or more settings of the set-top box to the restorable settings configuration comprises restoring the one or more settings of the set-top box to the restorable settings configuration for the particular user account but not for another user account of the set-top box.

14. The computing system of claim 10, wherein the trigger event further comprises receiving, from the remote control, an additional user input indicating to restore the one or more settings of the set-top box to the restorable settings configuration.

15. The computing system of claim 10, wherein the application is operating on a remote device separate from the remote control and the set-top box.

16. The computing system of claim 10, wherein the trigger event further comprises a power on or power off of the set-top box.

17. The computing system of claim 10, wherein the process further comprises:

analyzing the one or more settings of the set-top box or one or more additional user inputs at the remote control to determine that a restore of the one or more settings of the set-top box to the restorable settings configuration is desired; and in response to determining that a restore of the one or more settings of the set-top box to the restorable settings configuration is desired, notifying, on the application, the administrator of the set-top box to restore the one or more settings of the set-top box to the restorable settings configuration, the application operating on a remote device separate from the remote control and the set-top box.

18. The computing system of claim 17, wherein analyzing the one or more settings of the set-top box or the one or more additional user inputs at the remote control comprises utilizing a machine-learning (ML) model, the ML model trained based on at least one instance of previous changes to the one or more settings of the set-top box or at least one instance of previous user inputs at the remote control.

19. A non-transitory, computer-readable medium storing instructions that, when executed by a computing system, cause the computing system to perform operations comprising:

storing a first configuration of one or more settings of a set-top box as a restorable settings configuration, wherein the one or more settings of the set-top box comprise settings affecting an output of multimedia content by the set-top box, wherein the restorable settings configuration differs from a default settings configuration of the one or more settings of the set-top box;

in response to a user input from a remote control communicatively coupled with the set-top box, adjusting the one or more settings of the set-top box to a second configuration that differs from the restorable settings configuration;

providing, to an application associated with a content provider of the set-top box and usable for an administrator of the set-top box to manage operation of the set-top box, an indication that the one or more settings of the set-top box differ from the restorable settings configuration;

determining that a trigger event for restoring the one or more settings of the set-top box to the restorable settings configuration has occurred, wherein the trigger event comprises receiving, from the administrator of the set-top box through the application associated with the content provider, a command to restore the one or more settings of the set-top box to the restorable settings configuration; and without individually adjusting the one or more settings of the set-top box and in response to determining that the trigger event has occurred, restoring the one or more settings of the set-top box to the restorable settings configuration.

20. The non-transitory, computer-readable medium of claim 19, wherein the one or more settings comprises a favorite channels list, a tile size of the multimedia content output by the set-top box, a volume of the multimedia content output by the set-top box, a brightness of the multimedia content output by the set-top box, or whether to output subtitles with the multimedia content output by the set-top box.

* * * * *